Sept. 11, 1945.  R. E. AVERITT  2,384,522
AGRICULTURAL IMPLEMENT
Filed Dec. 6, 1943  4 Sheets-Sheet 1

Inventor
R. E. AVERITT

Sept. 11, 1945.  R. E. AVERITT  2,384,522
AGRICULTURAL IMPLEMENT
Filed Dec. 6, 1943  4 Sheets-Sheet 2

Inventor
R.E. AVERITT

Sept. 11, 1945.  R. E. AVERITT  2,384,522
AGRICULTURAL IMPLEMENT
Filed Dec. 6, 1943  4 Sheets-Sheet 4

Inventor
R. E. AVERITT
By Ross J. Woodward
Attorney

Patented Sept. 11, 1945

2,384,522

UNITED STATES PATENT OFFICE 2,384,522

AGRICULTURAL IMPLEMENT

Raymond E. Averitt, Albany, Ga.

Application December 6, 1943, Serial No. 513,133

4 Claims. (Cl. 55—110)

This invention relates to agricultural implements and more particularly to a machine used for harvesting underground crops such as peanuts, or for digging up grass, weeds, or the like.

One object of the invention is to provide a machine by the use of which weeds, peanuts, and the like, may be dug up, dirt shaken therefrom, and the plants deposited in windrows upon the ground as the machine is moved across a field.

Another object of the invention is to provide a machine by the use of which a crop may be dug from two rows of growing plants and the plants from both rows deposited in a single windrow between the rows of plants.

Another object of the invention is to so construct the machine that pivoted conveyors carried by plow shares may be agitated to shake dirt from the plowed-up plants, the pivoted conveyors of the two plow shares being both actuated from a single cam carried by a rotary shaft of the machine.

Another object of the invention is to provide a machine of this character adapted to be drawn across a field back of a tractor and powered from the power take-off shaft of the tractor.

Another object of the invention is to provide the machine with means for controlling the speed at which the cam-carrying shaft thereof rotates and thus regulate the speed at which the pivoted conveyors vibrate.

Another object of the invention is to provide a machine which is of simple construction and very strong.

The invention is illustrated in the accompanying drawings, in which.

This improved agricultural implement or machine has a main frame, indicated in general by the numeral 1, and having cross bars 2 and 3 to which longitudinally extending bars 4 are secured by welding or in any other desired manner.

Figure 2:
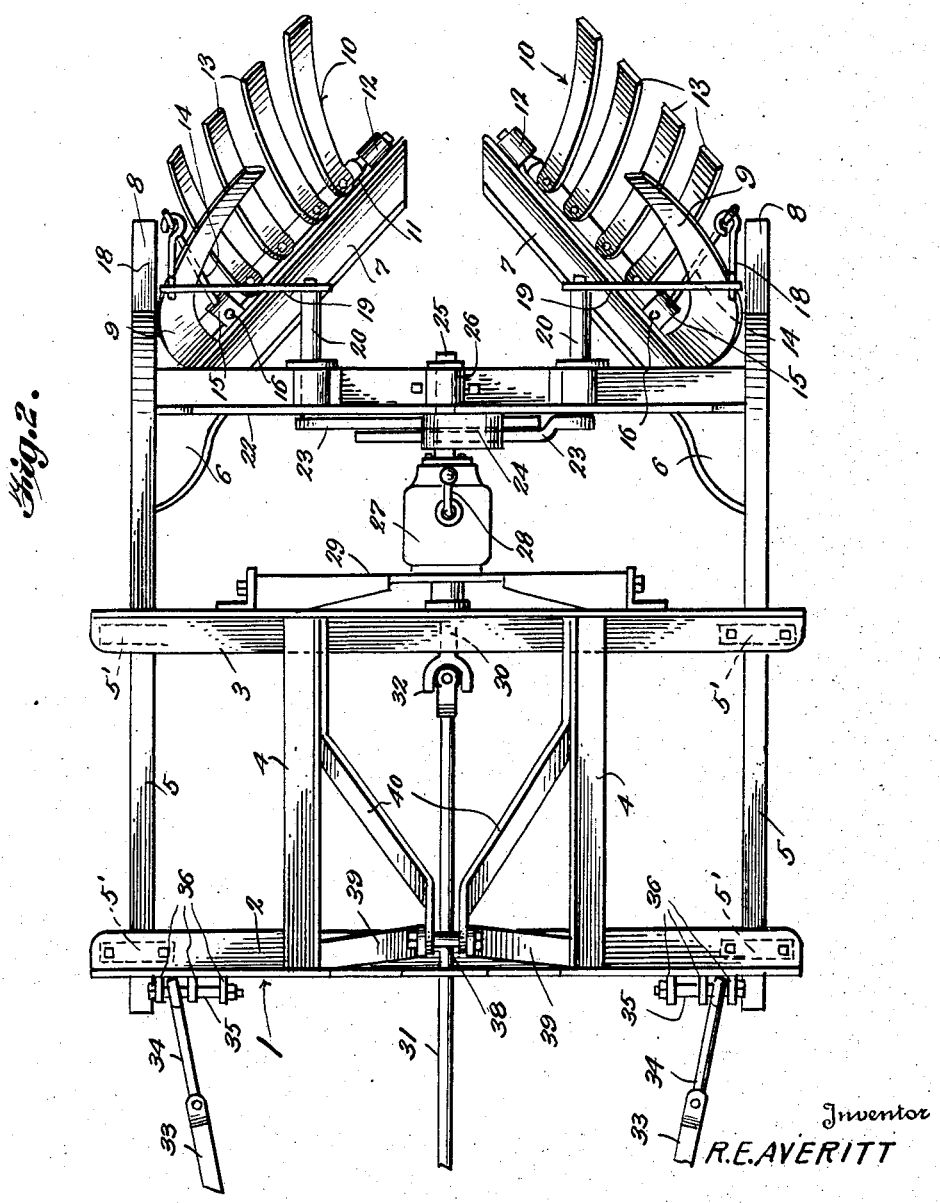
Figure 2 is a top plan view thereof.

The beams 5 of plows 6 are disposed at opposite sides of the frame 1 longitudinally thereof, where they are secured to the cross bars 2 and 5 by clamps 5', and the plows are sharpened along their front edges and extended to form blades 7 which are also sharpened along their lower front edges. This is clearly illustrated in Figure 2 of the drawings, and, referring to this figure, it will be seen that the blades extend inwardly of the machine and rearwardly thereof in converging relation to each other so that, when peanuts or other vines, plants, or other vegetation, are cut by the blades from two rows in a field, they will be directed inwardly of the machine between the rows of plants. Each plow has a rearwardly extending foot or bar 8 to provide a ground-engaging support and the blade of each plow carries an upstanding strip or arm 9 which is curved longitudinally and extends upwardly at a rearward incline. These strips or arms are similar in function to a moldboard of a plow since they serve to direct the cut plants rearwardly and inwardly and constitute substantially rigid conveyors for the cut vegetation.

Figure 1:
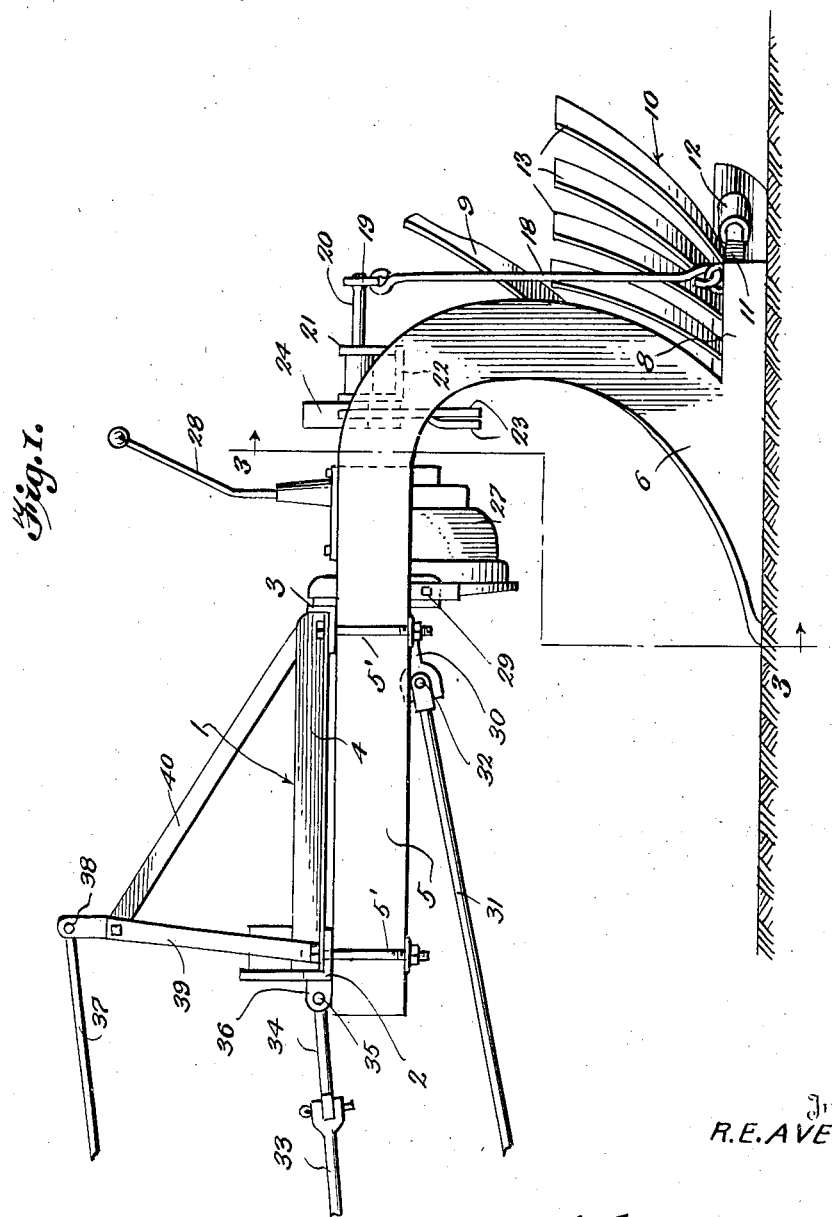
Figure 1 is a side elevation of the improved implement.
Figure 3:
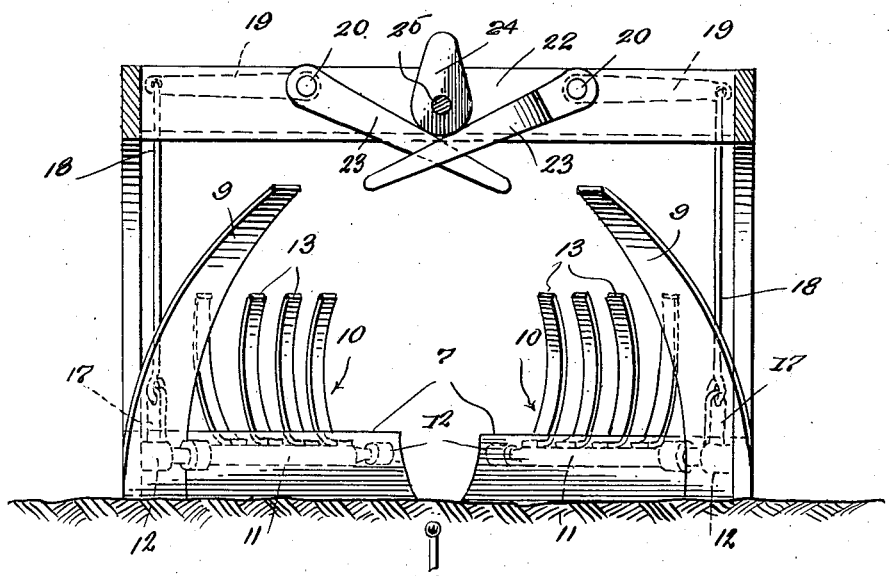
Figure 3 is a transverse sectional view taken through the machine on the line 3—3 of Fig. 1.
Figure 4:
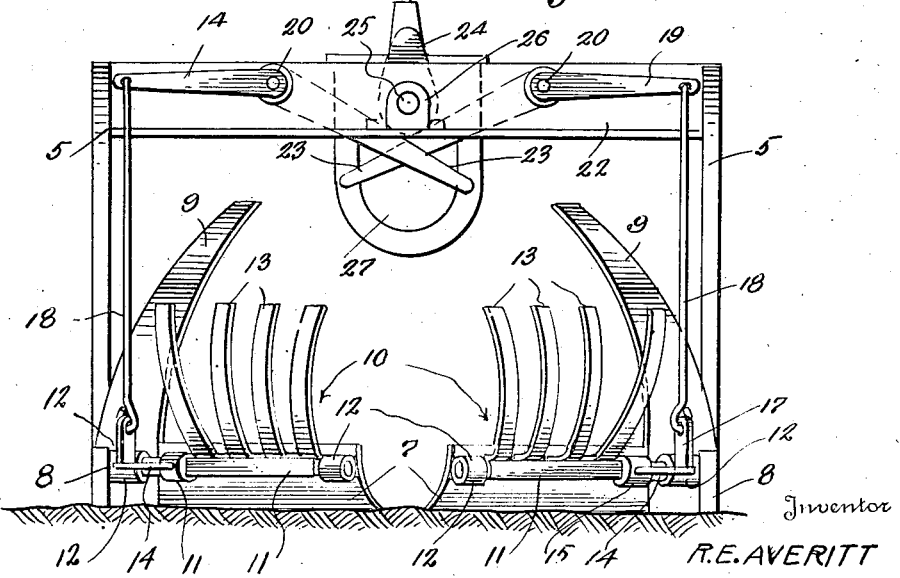
Figure 4 is a rear elevation of the machine.
Figure 5:
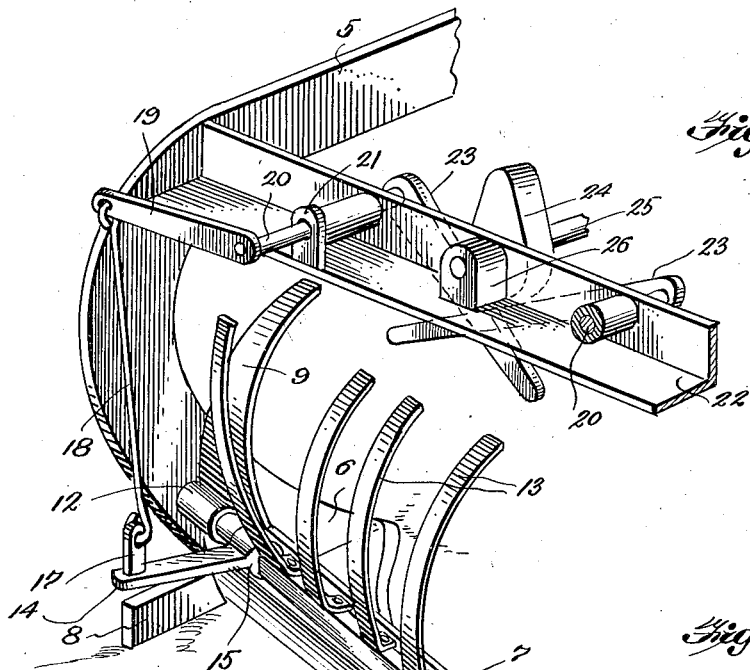
Figure 5 is a view showing a portion of the machine in perspective.
Figure 7:
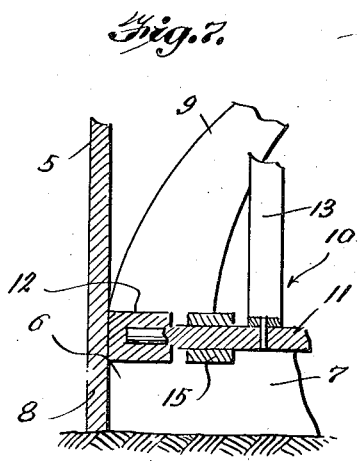
Fig. 7 is a sectional view on the line 7—7 of Figure 6.
Figure 6:
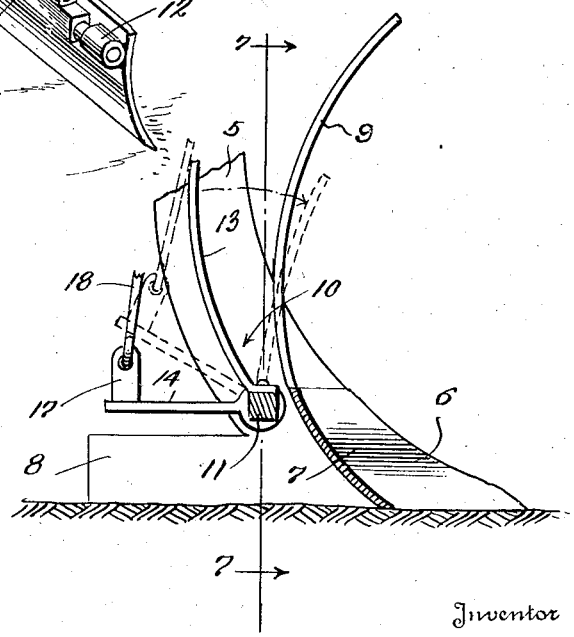
Figure 6 is a view showing one of the plows and its associated conveyor in vertical section.

Movable conveyors or agitators 10 are carried by the plows and each has a rocker shaft 11 rotatably mounted in bearings 12 and extending longitudinally of the blades 7 back of the same. Curved fingers 13 are fixed to the rocker shafts 11 and extend upwardly therefrom in spaced relation to each other, and, from an inspection of Figures 1, 3 and 4, it will be seen that as the peanut vines or other vegetation is directed rearwardly by the stationary conveyors 9, it will be deposited upon the movable conveyors. Arms 14 extend rearwardly from the rocker shafts with which they are connected by sleeves 15 provided with set screws 16 and the arms carry ears 17 to which are attached lower ends of rods 18. These rods are disposed vertically and have their upper ends connected with arms 19 which extend transversely of the machine and are carried by shafts 20 journaled through bearings 21 and an upstanding side flange or cross bar 22. At their front ends, the shafts 20 carry levers 23, and from an inspection of Figures 3, 4 and 5, it will be seen that when the levers 23 are moved to rock the shafts 20, turning motion will be imparted to the rocker shafts 11 and the fingers 13 oscillated. Therefore, the movable conveyors 10 will have a vibrating movement and dirt will be shaken from the plants or other vegetation moving along the movable conveyors. Since the plows are spaced from each other transversely of the machine a distance substantially equal to the distance between rows of plants in a field, plants will be dug from two rows at the same time and the plants deposited in a single windrow between the two rows as the machine is moved across a field.

The levers 23 are to be simultaneously actuated and, in order to do this, there has been provided a cam 24 carried by a shaft 25. This shaft extends longitudinally of the machine with its rear end mounted in a bearing 26 carried by the cross bar 22 and is housed in a casing 27 containing gearing of conventional form which is adjusted by a lever 28 for changing the speed at which the shaft 25 rotates. The casing or gear box 27 is supported by a hanger 29 carried by the cross bar 3 and the shaft 30 which is companion to the shaft 25 extends forwardly and is connected with a driving shaft 31 by a universal joint 32, the shaft 31 being of sufficient length to have its front end connected with the power take-off shaft of a tractor to which the machine is hitched.

Draft bars 33 extend forwardly from opposite sides of the machine for connection with a tractor and have their rear ends pivoted to links or short bars 34 carried by pins 35 which are mounted through brackets 36 projecting forwardly from the cross bar 2. By this arrangement, the draw is from opposite sides of the front end of the frame. There has also been provided a balancing rod or bar 37 extending forwardly from the machine and having its rear end engaged with a pin 38 carried by bracket bars 39 having rearwardly extending braces 40.

Having thus described the invention, what is claimed is:

1. An agricultural implement comprising a frame, plows carried by said frame at opposite sides of the frame and spaced from each other transversely thereof for operating in transversely spaced rows of a field, said plows having shares provided with diagonal moldboards extending rearwardly and inwardly of the frame in converging relation to each other, movable conveyors carried by said plows along the moldboards and each including a rocker shaft extending longitudinally of the moldboard of the companion plow in bearings projecting rearwardly therefrom and longitudinally curved fingers extending upwardly from the rocker shaft and spaced from each other longitudinally of the shaft and moldboard, strips extending upwardly from front ends of the mold boards in overlying relation to forward fingers of the movable conveyors and constituting stationary deflectors for directing vegetation uprooted by the plows into the movable conveyors, a horizontal cross bar mounted between beams of said plows, bell cranks each having a shaft rotatably mounted through the cross bar longitudinally of the frame and front and rear arms carried by its shaft, the rear arms of said bell cranks extending toward sides of the machine, rearwardly extending arms carried by the crank shafts, links connecting the arms of the crank shafts with the rear arms of the bell cranks, the front arms of the bell cranks extending inwardly of the frame in crossing relation to each other, a driven shaft rotatably mounted through said cross bar longitudinally of the frame, a cam carried by said driven shaft in front of the cross bar for engaging the front arms of the bell cranks and operating the bell cranks to impart agitating movement to the movable conveyors, means for transmitting rotation from a power take-off of a tractor to the driven shaft and regulating the speed at which the driven shaft rotates, and means for connecting the frame with a tractor and hitching the machine back of the tractor.

2. An agricultural implement comprising a frame, plows including beams carried thereby and spaced from each other transversely thereof for operating in spaced rows of a field, said plows having shares provided with diagonal moldboards extending rearwardly and inwardly of the frame in rearwardly converging relation to each other, movable conveyors carried by said plows and each including a rocker shaft extending longitudinally of the mold board of the companion plow in bearings projecting rearwardly therefrom and longitudinally curved fingers extending upwardly from the rocker shaft and spaced from each other longitudinally of the shaft and moldboard, strips extending upwardly from front ends of the moldboards in overlying relation to forward fingers of the movable conveyors and constituting stationary deflectors for directing vegetation uprooted by the plows onto the movable conveyors, a cross bar mounted between the beams of said plows, bell cranks having shafts rotatably mounted through the cross bar longitudinally of the frame and front and rear arms carried by the shafts, the rear arms extending toward the sides of the machine, arms carried by the front ends of the crank shafts and extending rearwardly from the moldboards, links connecting the arms of the crank shafts with the rear arms of the bell cranks, the front arms of the bell cranks extending inwardly of the frame and downwardly in crossing relation to each other, means for hitching the frame back of a tractor, and means for actuating the bell cranks including a rotatably mounted driven shaft extending longitudinally of the frame journaled through the cross bar and carrying a laterally extending cam for engaging the front arms of the bell cranks.

3. An agricultural machine of the character described comprising a frame, plows carried by said frame and spaced from each other transversly thereof, said plows having shares and diagonal blades extending therefrom inwardly of the frame at a rearward incline in rearward converging relation to each other with their rear ends spaced from each other, rocker shafts extending longitudinally of said blades and rotatably mounted in bearings carried by the blade, fingers extending upwardly from said rocker shafts in transverse spaced relation to each other and together therewith constituting movable conveyors for receiving vegetation from the plows and depositing same in a windrow upon the ground between rear ends of the blades after shaking dirt from the vegetation, strips fixed to said blades near front ends thereof and extending upwardly and rearwardly in overlapping relation to the fingers of the movable conveyors and constituting deflectors for directing vegetation thereon, a cross bar extending transversely of the frame over front ends of said blades, bell cranks rotatably carried by the cross bar and connected with the rocker shafts for rocking the same and imparting vibratory movement to the movable conveyors, a rotatably mounted driven shaft extending longitudinally of the frame between the bell cranks, a cam carried by said driven shaft for engaging and operating the bell cranks during rotation of the driven shaft, and means for transmitting rotary motion to the driven shaft.

4. An agricultural machine of the character described comprising a frame, plows carried by said frame and spaced from each other transversely thereof, said plows having shares and blades extending therefrom inwardly of the frame at a rearward incline in rearward converging relation to each other with their rear ends spaced from each other, rocker shafts extending longitudinally of said blades and rotatably mounted back of the blades, fingers extending outwardly and upwardly from said rocker shafts and together therewith constituting movable conveyors for receiving vegetation from the plows and depositing same in a windrow upon the ground between rear ends of the blades after shaking dirt from the vegetation, arms extending from said rocker shafts, bell cranks having shafts extending longitudinally of the frame and oppositely extending front and rear arms, the rear arms being connected with the arms of the rocker shafts for rocking the shafts and vibrating the movable conveyors, and mechanism for actuating the bell cranks including a rotatable driven shaft carrying a cam disposed between the bell cranks and engaging the front arms of the bell cranks for actuating the bell cranks as the driven shaft rotates.

RAYMOND E. AVERITT.